Feb. 24, 1970  N. A. AZELBORN  3,496,993
GAS TURBINE HEAT EXCHANGING SYSTEM USING SLOTTED
BRACKETS FOR TORQUE TRANSMISSION
Filed Aug. 29, 1968
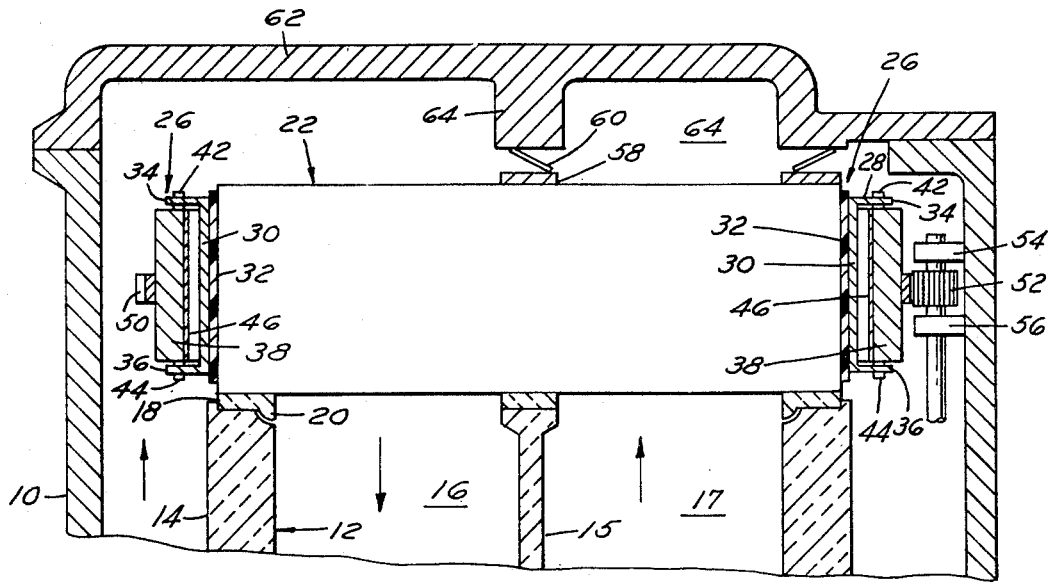
INVENTOR.
NICOLAS A. AZELBORN
BY
John R. Faulkner
Glenn D. Arendsen
ATTORNEYS

United States Patent Office 3,496,993
Patented Feb. 24, 1970

3,496,993
GAS TURBINE HEAT EXCHANGING SYSTEM USING SLOTTED BRACKETS FOR TORQUE TRANSMISSION
Nicolas A. Azelborn, Ypsilanti, Mich., assignor to Ford Motor Company, Dearborn, Mich., a corporation of Delaware
Filed Aug. 29, 1968, Ser. No. 756,172
Int. Cl. F16d *3/14;* F16h *55/14;* F28d *19/00*
U.S. Cl. 165—8
13 Claims

ABSTRACT OF THE DISCLOSURE

The base of a C-shaped bracket is bonded to a flexible pad that bears against the exterior periphery of a ceramic regenerator core. Bracket legs extend along each side of an annular metal ring gear and studs on the sides of the ring gear slide in grooves in the bracket legs. Leaf-type springs positioned between the bracket base and the ring gear urge the ring gear radially outwardly from the core.

SUMMARY OF THE INVENTION

The efficiency of a gas turbine engine increases directly with the temperature of the gases entering the turbine wheel, and extensive research has been directed toward finding new high temperature materials and fabricating these materials into gas turbine engine components. A portion of this research recently produced a ceramic regenerator capable of surviving for extended periods of time in the higher temperatures and of performing an efficient heat exchanging function. Metal gears are needed to drive such regenerator cores, however, and the differences in thermal expansion coefficients of the ceramic and the metal have produced considerable difficulties in finding a suitable driving system therefor.

This invention provides a driving system for a gas turbine ceramic regenerator core that uses a wedging action between the core and an annular driving member to transmit driving torque while permitting thermal expansion differences between the core and the driving member. In a gas turbine engine having a rotatably mounted ceramic regenerator core porous to gases flowing essentially parallel to the core rotational axis, the driving system comprises an annular driving member extending around the periphery of the core that has a plurality of projecting studs on its sides. A plurality of locating members are positioned between the core and the driving member. The locating members position the driving member relative to the core and also transmit driving torque from the driving member to the core. Each locating member comprises a flexible pad contacting the exterior periphery of the core, a bracket fastened to the pad and having an outwardly directed slot fitting slidably on the studs of the driving member, and a preloading member positioned between the core and the driving member to urge the driving member radially away from the core.

The driving member usually is a metal ring gear having gear teeth on its exterior surface, although friction driving members of various materials also can be used. A C-shaped bracket is preferred since the legs of such a bracket can project along each side of the driving member and each leg can have a slot-stud arrangement. Leaf springs serve efficiently as the preload members.

Driving torque applied to the driving member is transmitted to the brackets via the studs and the brackets in turn transmit the torque through the flexible pad to the ceramic core. The pads distribute the driving torque on the core periphery and thereby prevent torque induced stress concentrations. Thermally induced dimension changes between the core and the driving member are absorbed by the flexible pads and by sliding movement of the studs relative to the slots. A plurality of equally spaced flat portions can be formed on the core periphery, and the pads can be mounted on the flat portions. High engine operating temperatures are achieved by resting the core on a substantially circular ceramic inner housing having a diametrical wall dividing the inner housing into two semicircular passages. The inner housing is surrounded by the engine outer housing that forms an annular space around the core and driving member assembly. A passage transmitting relatively cool air from the compressor to the regenerator communicates with the annular space and bathes the driving member and the locating members in the cool air.

BRIEF DESCRIPTION OF THE DRAWINGS

FIGURE 1 is a sectional elevation of a portion of a gas turbine engine showing the relationship of the locating members to a ceramic regenerator core and ring gear.

FIGURE 2 is a top view of a portion of the regenerator core, ring gear, and locating member assembly with a portion of one leg of the bracket broken away to show the use of a leaf-type spring to urge the ring gear away from the core.

DETAILED DESCRIPTION

Referring to FIGURE 1, a gas turbine engine containing the system of this invention has an essentially elliptical metal outer housing 10 that is open at the top of the regenerator portion. FIGURE 1 is sectioned along the major diameter of the ellipse. A smaller ceramic inner housing 12 is located inside housing 10 and terminates a short distance from the opening thereof. Inner housing 12 comprises an outer cylindrical wall 14 divided diametrically by a wall 15 into two semicircular passages 16 and 17. Wall 14 forms an annular passage 13 between part of its circumference and housing 10. A solid ceramic rubbing seal 18 having the same shape as housing 12 is located on top of housing 12 where it is restrained from circular movement by fitting ribs 20 on the underside of seal 18 into corresponding grooves on the top of housing 12. Seal 18 is made of a ceramic having good wearing properties such as a nickel oxide-calcium fluoride combination and can be formed integrally with inner housing 12.

A ceramic regenerator core 22 is mounted rotatably on top of seal 18. The core is porous to gases flowing essentially parallel to the rotational axis of the core and can have either a circular exterior surface as shown in FIGURE 1 or an exterior surface made up of a plurality of flat portions 24 as shown in FIGURE 2. About twelve flat portions 24 has been found to be particularly useful, and the flat portions preferably intersect each other so the core is shaped like a twelve sided regular polygon.

A locating member indicated generally by numeral 26 is positioned on each flat portion 24 or a plurality of locating members are spaced around the exterior periphery of a circular core. Each locating member 26 comprises a C-shaped bracket 28 having its base 30 bonded to a flexible pad 32. The legs 34 and 36 of each bracket extend along the sides of an annular ring gear 38. Two slots, one of which is designated by numeral 40 in FIGURE 2, are formed in each leg 34 and 36 so the slots extend outwardly and are angled in the direction of the core rotation.

Projecting studs 42 and 44 on the upper and lower sides of ring gear 38 fit slidably in slots 40. A leaf-type spring 46 has its ends fastened to base 30 of bracket 28 and the center portion of spring 46 bears against the inner periphery of ring gear 38. The ends of spring 46 can be welded to base 30 or can fit into shallow grooves, one of which is represented by numeral 48 in FIGURE 2.

Ring gear 38 has gear teeth 50 on its exterior surface. A pinion gear 52 supported between two bosses 54 and 56 projecting inwardly from housing 10 engages teeth 50. Gear 52 is driven from the gas generator turbine wheel (not shown) of the engine.

A D-shaped seal 58 has its straight portion located above wall 15 and its semicircular portion located above the semicircular portion of housing 12 forming passage 17 with the bottom of seal 58 in rubbing contact with core 22. Seal 58 can be made of metal having a wearing surface on its lower side suitable for use on ceramics; a typical seal is described in U.S. Patent application Whalen et al. Ser. No. 613,920, filed Feb. 3, 1967, the entire disclosure of which is incorporated herein. A metal foil seal 60 is welded to the top inner edge of seal 58.

The open portion of outer housing 10 is covered by a metal cap 62. Cap 62 has a downwardly projecting ridge 64 aligned with diametrical wall 15 of the inner housing. Ridge 64 bears on the straight portion of foil seal 60 and a portion of the circumference of cap 62 bears on the semicircular portion of foil seal 60. Foil seal 60 is made of spring stock and is deflected by cap 62 to urge core 22 downward onto seal 18. Rotation of seal 58 is restrained by projecting fingers (not shown) on cap 42 or housing 10.

During engine operation relatively cool air from the compressor flows up passage 13 and is turned downward by cap 62 into the porous portion of rotating regenerator core 22. The air passes through the portion of core 22 located above passage 16 and continues downward through 16 to the engine combustion chamber (not shown). Hot combustion gases from the combustion chamber pass initially through the turbine wheels (not shown) and then flow upward through passage 17, the portion of core 22 above passage 17, and into space 64 which exhausts the gases to the atmosphere.

The temperature of the gases in passage 17 is extremely high and can exceed 1800° F. A considerable portion of this heat is transferred by the rotating regenerator core to the air passing through the sector of the core above passage 16. Gas temperatures in space 64 are considerably less than the temperature in passage 17 so metal seals 58 and 60 survive for useful periods. Relatively cool air from passage 13 surrounds the exterior periphery of core 22 so ring gear 38, locating members 26, and pinion gear 52 operate in a relatively cool environment.

Pad 32 can be made of a fibrous material such as asbestos or of a high temperture elastomeric material such as Dow-Corning Silastic 69. Elastomeric materials having a foamed structure with a void volume of up to 30 volume percent have an excellent combination of torque transmitting properties and elasticity for absorbing thermally induced dimensional changes and are preferred.

Driving torque from the ring gear is transmitted by studs 42 and 44 to bracket 26 which in turn transmits the driving torque to pad 32. Pad 32 distributes the driving torque to core 22 uniformly, thereby preventing stress concentrations at the core periphery. Leaf springs 46 provide a preload between the ring gear and core and insure that the pads maintain frictional driving contact with the core. Differences in thermal expansion are absorbed partially by the pads and, to a greater extent, by movement of studs 42 and 44 in slots 40.

Thus this invention provides a gas turbine heat exchanging system capable of operating in relatively high temperatures combustion gases. The system distributes driving torque to the exterior periphery of the regenerator core and absorbs differences in thermal expansion without significant stress concentrations.

What is claimed is:

1. In a heat exchanging system for a gas turbine engine having a ceramic regenerator core mounted rotatably therein, said core being porous to gases flowing essentially parallel to the core rotational axis, a driving system for said core comprising
    an annular driving means extending around the periphery of the core, said driving means having a plurality of projecting studs on at least one side, and
    a plurality of locating members positioned between the core and driving means, each of said locating members comprising,
    a flexible pad contacting the exterior periphery of the core,
    a bracket fastened to said pad, said bracket having an outwardly directed slot therein, said studs on said driving means fitting slidably in said slots, and
    preloading means positioned between said core and said ring gear to urge the ring gear radially away from the core.

2. The system of claim 1 in which the bracket has a C-shaped cross section and is positioned so the legs of the bracket extend along each side of the driving means, each of said legs having an outwardly directed slot therein.

3. The system of claim 2 in which the slots in the legs of the brackets are angled in the direction of the core rotation.

4. The system of claim 3 in which the preloading means is a leaf spring positioned between the base of the bracket and the ring gear, at least one end of each spring being connected to the base of its bracket.

5. The system of claim 4 in which both ends of each spring are connected to the base of its bracket and the center portion of the spring bears against the ring gear.

6. The system of claim 5 in which the flexible pad is an elastomeric material.

7. The system of claim 6 in which the elastomeric material has a foamed structure containing up to about 30 volume percent of void space.

8. The system of claim 7 in which the core has a plurality of flats on its exterior surface and the pads are positioned on said flats.

9. The system of claim 8 in which the driving means is a metal ring gear having gear teeth on its exterior surface and the core rests on a substantially circular ceramic inner housing having a diametrical wall dividing said inner housing into two semicircular passages, said inner housing being surrounded by an outer housing forming an annular space surrounding said core and driving means assembly, said annular space communicating with a passage supplying relatively cool air to the regenerator core.

10. The system of claim 1 in which each preloading means is a leaf spring having its ends connected to the base of its bracket and its center portion bearing against the ring gear.

11. The system of claim 1 in which the flexible pad is an elastomeric material.

12. The system of claim 1 in which the core has a plurality of flats on its exterior surface and the pads are positioned on said flats.

13. The system of claim 1 in which the driving means is a metal ring gear having gear teeth on its exterior surface and the core rests on a substantially circular ceramic inner housing having a diametrical wall dividing said inner housing into two semicircular passages, said inner housing being surrounded by an outer housing forming an annular space surrounding said core and driving means assembly, said annular space communicating with a passage supplying relatively cool air to the regenerator core.

References Cited

UNITED STATES PATENTS

| | | | |
|---|---|---|---|
| 3,167,115 | 1/1965 | Chute | 165—7 |
| 3,301,317 | 1/1967 | Weaving et al. | 165—8 |
| 3,363,478 | 1/1968 | Lanning | 74—446 |
| 3,430,687 | 3/1969 | Wardale | 165—8 |

FOREIGN PATENTS 975,776  11/1964  Great Britain.

MEYER PERLIN, Primary Examiner

ALBERT W. DAVIS, Assistant Examiner

U.S. Cl. X.R.

74—443, 446; 64—11, 27; 165—10